UNITED STATES PATENT OFFICE.

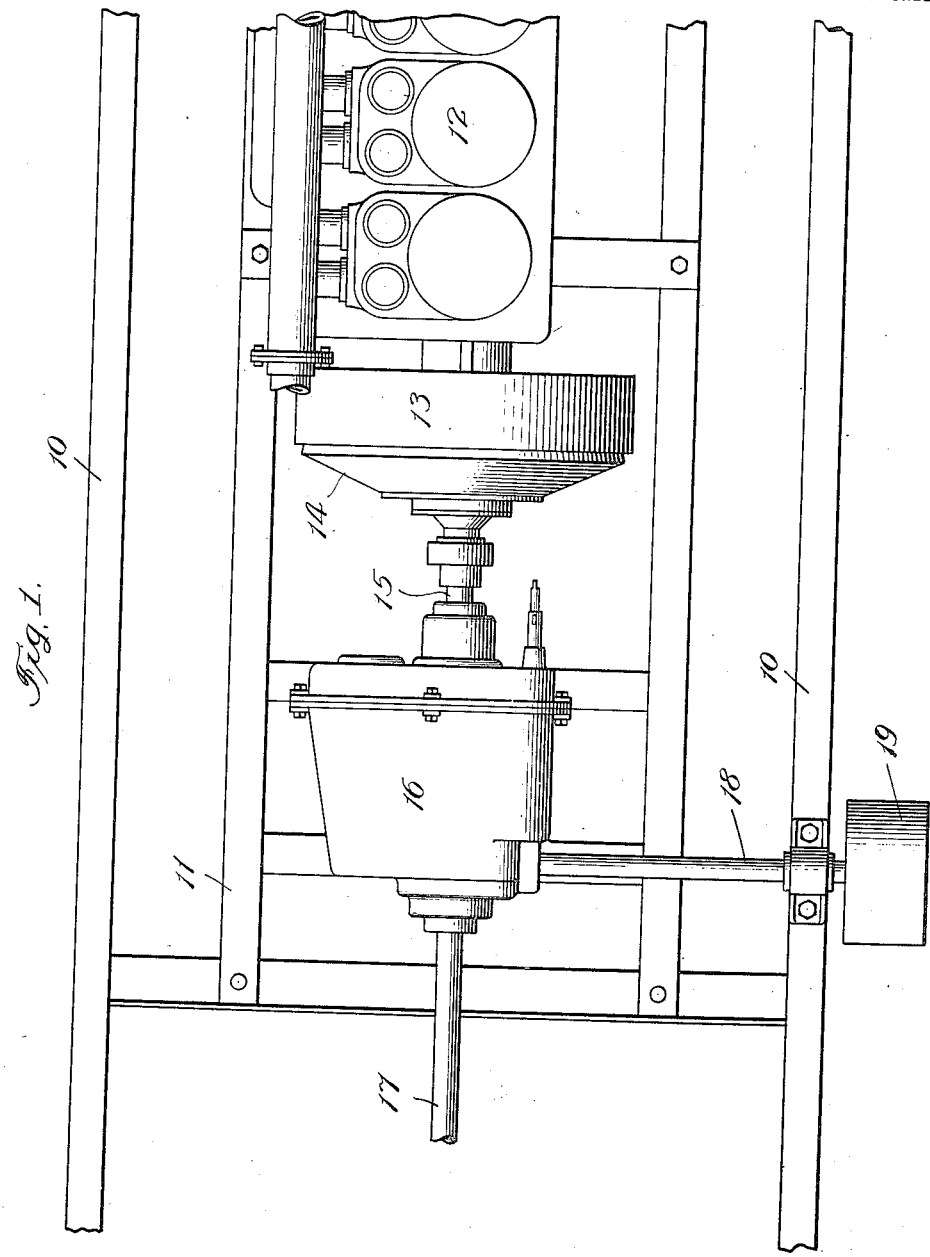

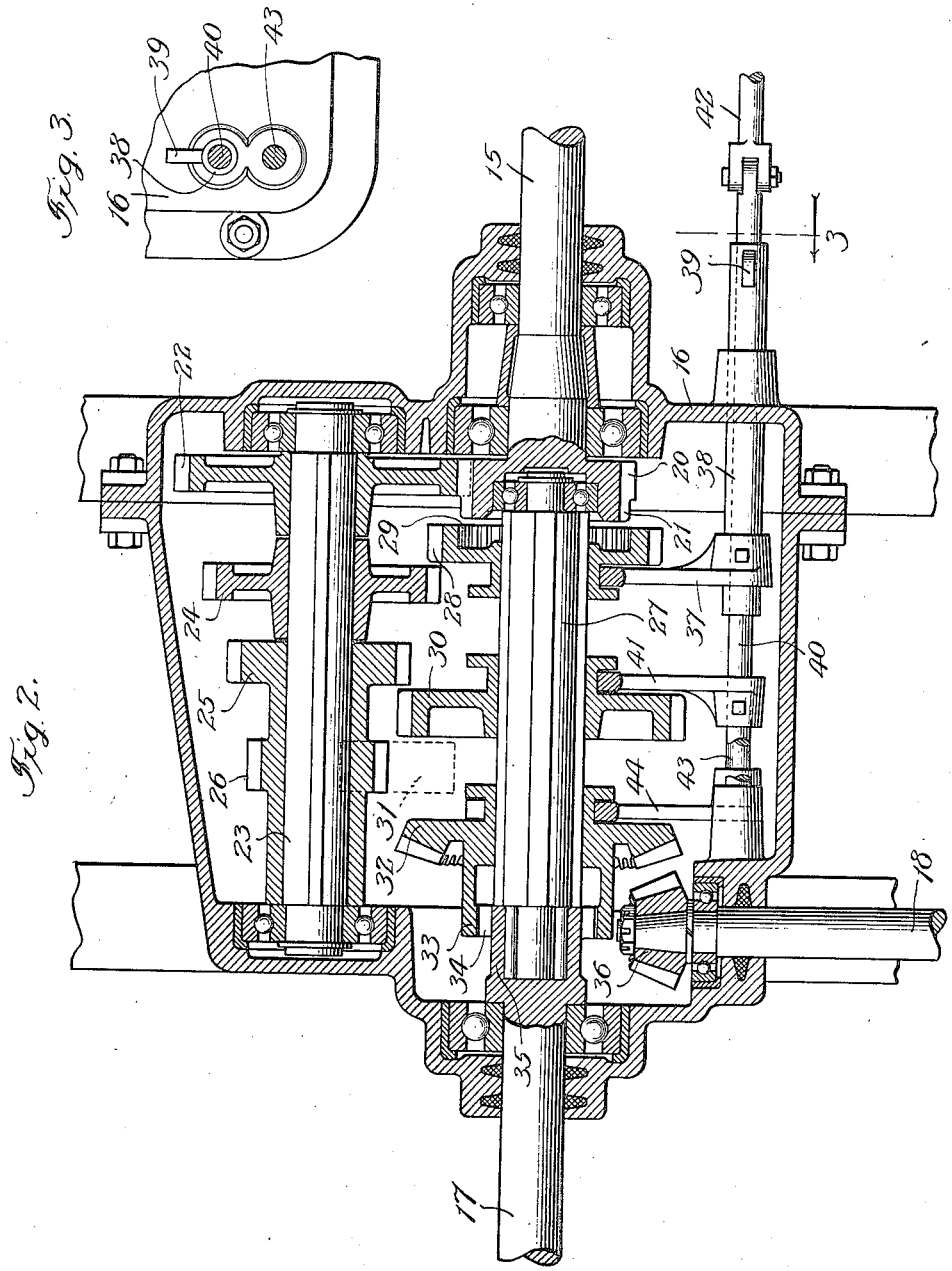

HARRY C. WAITE, OF CHICAGO, ILLINOIS, ASSIGNOR TO WAITE TRACTOR COMPANY, OF CHICAGO, ILLINOIS, A CORPORATION OF ILLINOIS.

GEARING FOR MOTOR-VEHICLES.

1,210,874.   Specification of Letters Patent.   Patented Jan. 2, 1917.

Application filed October 1, 1915. Serial No. 53,482.

*To all whom it may concern:*

Be it known that I, HARRY C. WAITE, a citizen of the United States, residing at West Pullman, Chicago, in the county of Cook and State of Illinois, have invented a new and useful Improvement in Gearing for Motor-Vehicles, of which the following is a specification.

My invention relates to improvements in gearing designed for use on motor-driven vehicles, particularly vehicles of the type of agricultural tractors.

The object of the invention is to provide a transmission gearing suitable for such service and in which means is provided for driving external machinery from the vehicle motor, the clutch and change speed and reverse gearing of the vehicle being also used to control the movements of the said external driving means.

My invention will be more readily understood from the accompanying drawings, in which:—

Figure 1 is a plan view of the central portion of the chassis frame of an agricultural tractor, showing the general relation to the parts which constitute the subject-matter of my invention. Fig. 2 is an enlarged sectional view through the transmission housing of Fig. 1, and Fig. 3 is a section taken on the line 3 of Fig. 2 and showing the way in which the control rods for the transmission gearing are arranged.

Referring more particularly to the drawings, the numeral 10 designates the chassis frame and the numeral 11 the sub-frame of the vehicle in which the engine and transmission are mounted. The engine which is shown in the drawing as an internal combustion engine and designated by the numeral 12, is mounted longitudinally of the sub-frame and in the front portion thereof. According to common practice the fly-wheel 13 of the engine carries or serves as the female member for a cone-clutch 14. The clutch 14 is secured to a drive-shaft 15 which enters a transmission gear housing 16 and through gears inclosed in the latter is adapted to drive at varying forward and reverse speeds a propeller shaft 17 in alinement with the drive-shaft 15 and which may lead directly to the rear axle of the vehicle or to a jack-shaft from which the rear wheels are driven.

It is the particular object of the present invention to provide a means by which the driven members of the transmission gearing, located within the housing 16, may actuate a transversely-arranged shaft 18 which extends beyond the chassis frame 10 and carries external drive means, such as the pulley 19, on its projecting end, whereby the motor 12 may be used to actuate external machinery, such as threshers, choppers, or the like, the clutch 14 and transmission gearing within the housing 16 being made to control the operation of such driven machinery. One method of accomplishing this result is to make use of the form of transmission gearing illustrated in detail in Fig. 2. From this view it will be seen that the drive-shaft 15 enters the forward end of the transmission housing 16 and just within this end carries a driving gear 20, the outer ends of the teeth of which, designated by 21, are intended to form clutch members as will later appear. The gear 20 is in mesh with a driven gear 22 keyed upon a lay-shaft 23 which is mounted parallel with the drive-shaft 15. The shaft 23 also carries a gear 24, which is known as the second speed gear, and gears 25 and 26, known respectively as first speed and reverse gears. Parallel with the lay-shaft 23 and in alinement with the drive-shaft 15 there is mounted a connecting shaft 27 which extends between the drive-shaft 15 and propeller shaft 17, being provided with bearings in each of these shafts. Splined upon the connecting shaft 27 there is a slidable gear 28 which is adapted to be brought into mesh with the second-speed gear 24 of the lay-shaft in one position and in another position is adapted to have internal clutch teeth 29 formed thereon brought into engagement with the clutch teeth 21 of the driving gear 20. Behind the sliding gear 28, there is a second sliding gear 30 which, in one position is adapted to engage the first-speed gear 25 of the lay-shaft and in a second position is adapted to engage a reverse pinion 31 mounted below and normally in mesh with the reverse gear 26 of the lay-shaft. Beyond the sliding gear 30 there is a third sliding member 32 formed as a rearwardly facing bevel gear carrying an extended hub 33 provided with internal clutch teeth, which are adapted to be moved into or out of engagement with external clutch teeth 34 formed on the end 35 of the propeller shaft 17. The shaft 18 enters the transmission gear housing 16 at its rear end adjacent the bevel gear 32 and carries a bevel pinion 36 with which the bevel gear is adapted to mesh when it is moved to disengage its clutch teeth from the teeth 34 of the propeller shaft 17.

For shifting the slidable gear 28 a shifter arm 37 of ordinary construction is provided which is mounted upon a tubular shifter rod 38 which extends through a bearing in the front end of the housing 16 and is provided with an upstanding ear 39 (see Fig. 3) for the attachment of a control rod. Within the tubular shifter rod 38 there is mounted a second shifter rod 40 which carries an arm 41 for shifting the gear 30. The rod 40 which is shown broken in the drawings may be supported at its rearward end in a slide bearing carried by the housing 16 and at its forward end may be connected to an operating link or rod 42. Below the concentric shifters 40 and 38, there is mounted a third shifter rod 43 which carries an arm 44 by which the bevel gear and clutch member 32 may be shifted.

The operation of my improved gearing is as follows: When the tractor, or the like vehicle, is being operated as such, the bevel gear 32 will occupy the position in which it is shown in Fig. 2 of the drawings, serving then as a connector or clutch member uniting the shaft 27 with the propeller shaft 17. The clutch 14 and the change-speed gearing will then be operated in the usual manner to control the forward and reverse movements of the tractor. When it is desired to use the motor of the tractor as a driving means for some external machinery, the tractor will be maneuvered into the proper position, the external pulley 14 will be belted to the machine which it is desired to drive, and the shifter rod 43 connected to the bevel gear 32 will be operated as by some suitable hand-lever to move this bevel gear and its connected clutch to the rear, whereby the clutch will be disengaged from the propeller shaft 17 and the gear 32 brought into mesh with the pinion 36. The motor clutch 14 and the transmission gearing will then be operated in a well-understood manner to control the stopping, starting, speed and the direction of rotation of the pulley 14 and through it of the machine which it drives. When it is again desired to use the tractor or the like as a vehicle the rod 43 will again be shifted to bring the bevel gear 32 to the position shown in Fig. 2 of the drawings. It will thus be seen that by a very simple change in a standard form of transmission gearing the same has been adapted to the purposes of the present invention, the combination as a whole acting to permit of driving an external machine from the vehicle motor in the simplest possible manner, retaining all of the advantages of the ordinary form of clutch and transmission.

While I have shown and described in considerable detail one specific embodiment of my invention, it is to be understood that such showing and description is illustrative only and for the purpose of making my invention more clear, and that I do not regard the invention as limited to these specific details of construction, except in so far as such limitations are included within the terms of the following claims, in which it is my intention to claim all novelty inherent in my invention as broadly as possible in view of the prior art.

What I claim as new and desire to secure by Letters Patent is:

1. In a vehicle, a motor, a drive-shaft, a clutch interposed between the motor and the drive-shaft, a variable speed transmission gearing connected with the said drive-shaft, a propelling shaft for the vehicle wheels in alinement with said drive-shaft, a second shaft unconnected with the vehicle wheels and at right-angles to said propeller shaft, and a movable clutch element carried by the variably-driven end of said transmission gearing and adapted to selectively engage said propelling shaft or said second-named shaft.

2. In a vehicle, a motor, a drive-shaft, a clutch interposed between the motor and the drive-shaft, a variable speed transmission gearing connected with the said drive-shaft, a propelling shaft for the vehicle wheels in alinement with said drive-shaft, a second shaft unconnected with the vehicle wheels and at right-angles to said propeller shaft, disengageable means for driving the said propelling shaft from the variably driven end of said transmission gearing, and means for driving said second-named shaft from the said variably-driven end of the transmission gearing.

3. In a vehicle, a motor, a drive-shaft, a clutch interposed between the motor and drive-shaft, a variable speed transmission gearing connected with said drive-shaft, a propelling shaft for the vehicle wheels in alinement with said drive-shaft, a second shaft unconnected with the vehicle wheels and at right-angles to said propeller-shaft, means for driving each of said last-named shafts from the variably-driven end of said transmission gearing, said means operating to simultaneously engage one shaft and release the other shaft or to engage the second shaft and release the first shaft.

4. In a vehicle, a motor, a drive-shaft, a clutch interposed between the motor and drive-shaft, a variable speed transmission gearing connected with the said drive-shaft, a propelling shaft for the vehicle wheels in alinement with the variably-driven end of said transmission gearing, a slidable clutch carried by the said end of the transmission gearing and adapted to engage the said propelling shaft, a gear connected with the said clutch, a second shaft unconnected with the vehicle wheels, and a pinion carried by said second shaft in position to be engaged by said gear when the clutch is moved out of engagement with the propelling shaft.

5. In a vehicle, a motor, a drive-shaft, a clutch interposed between the motor and drive-shaft, a connector shaft in alinement with the drive-shaft, a lay-shaft parallel with the connector shaft, means for driving the lay-shaft from the drive-shaft, means for driving the connecting shaft at variable speeds from the lay-shaft, a propelling shaft for operating the vehicle wheels in alinement with said connecting shaft, means for clutching said connecting shaft directly to the drive-shaft, a slidable clutch member mounted on said connecting shaft and adapted in one position to engage the latter with the propelling shaft, a bevel gear connected with said clutch, a second shaft arranged at right-angles to said connecting shaft, and a bevel pinion carried by said last-named shaft and in position to be engaged by said bevel gear when the clutch member is moved to release the said propelling shaft.

HARRY C. WAITE.

In presence of—
 A. C. FISCHER,
 A. M. MASON.